United States Patent
Hughes et al.

(10) Patent No.: US 9,244,746 B2
(45) Date of Patent: Jan. 26, 2016

(54) AUTOMATIC TRANSACTION COARSENING

(71) Applicants: Christopher J. Hughes, Santa Clara, CA (US); Richard M. Yoo, Stanford, CA (US)

(72) Inventors: Christopher J. Hughes, Santa Clara, CA (US); Richard M. Yoo, Stanford, CA (US)

(73) Assignee: Intel Corporation, Santa Clara, CA (US)

(*) Notice: Subject to any disclaimer, the term of this patent is extended or adjusted under 35 U.S.C. 154(b) by 247 days.

(21) Appl. No.: 13/956,609

(22) Filed: Aug. 1, 2013

(65) Prior Publication Data
US 2015/0039841 A1 Feb. 5, 2015

(51) Int. Cl.
*G06F 9/46* (2006.01)
*G06F 9/52* (2006.01)

(52) U.S. Cl.
CPC ............... *G06F 9/526* (2013.01); *G06F 9/467* (2013.01)

(58) Field of Classification Search
CPC .................................. G06F 9/467; G06F 9/526
See application file for complete search history.

(56) References Cited

U.S. PATENT DOCUMENTS

2004/0010500 A1* 1/2004 Madduri et al. ............... 707/100
2014/0281236 A1* 9/2014 Rash et al. .................... 711/122

* cited by examiner

*Primary Examiner* — Yong Choe
(74) *Attorney, Agent, or Firm* — Lowenstein Sandler LLP

(57) ABSTRACT

A processing device comprises an instruction execution unit and track and combing logic to combine a plurality of transactions into a single combined transaction. The track and combine logic comprises a transaction monitoring module to monitor an execution of a plurality of transactions by the instruction execution unit, each of the plurality of transactions comprising a transaction begin instruction, at least one operation instruction and a transaction end instruction. The track and combine logic further comprises a transaction combination module to identify, in view of the monitoring, a subset of the plurality of transactions to combine into a single combined transaction for execution on the processing device and to combine the identified subset of the plurality of transactions into the single combined transaction, the single combined transaction comprising a single transaction begin instruction, a plurality of operation instructions corresponding to the subset of the plurality of transactions and a single transaction end instruction.

18 Claims, 13 Drawing Sheets

| Transaction Tracking Table 116 | | | | |
|---|---|---|---|---|
| xbegin IP | xend IP | # of xbegins | # of aborts | Status | # of iterations |
| | | | | | |
| | | | | | |

| Transaction Combining Status Register 118 | | | |
|---|---|---|---|
| Transaction Status | Last xbegin IP | Expected xend IP | # of transactions to combine |
| | | | |

Fig. 3B

AUTOMATIC TRANSACTION COARSENING

TECHNICAL FIELD

This disclosure relates to the field of processing device and, in particular, to automatic transaction coarsening for transactional memory processing.

BACKGROUND

Mutual exclusion (mutex) locks are the traditional primitive used to provide atomicity in software execution. For example, a set of threads performing indirect updates on a storage array can be parallelized using locks. The overhead for grabbing a lock can be very large compared to the real work being done, however, making execution of certain code using the locks too slow in practice. Another option to provide the atomicity is to parallelize the code using transactions. In this case, the acquiring and release of the lock is replaced with transaction begin and transaction end instructions. Transactions may have lower overhead than locks, making this transactional parallelization more reasonable. In conventional systems, however, hardware support for transactions typically still carries significant overhead. Thus, even using transactions, parallelization of the code is usually not very fast.

BRIEF DESCRIPTION OF THE DRAWINGS

The present disclosure is illustrated by way of example, and not by way of limitation, in the figures of the accompanying drawings.

FIG. 3A is a diagram illustrating a transaction tracking table, according to an embodiment.

FIG. 3B is a diagram illustrating a transaction combining status register, according to an embodiment.

DETAILED DESCRIPTION

Figure 1:
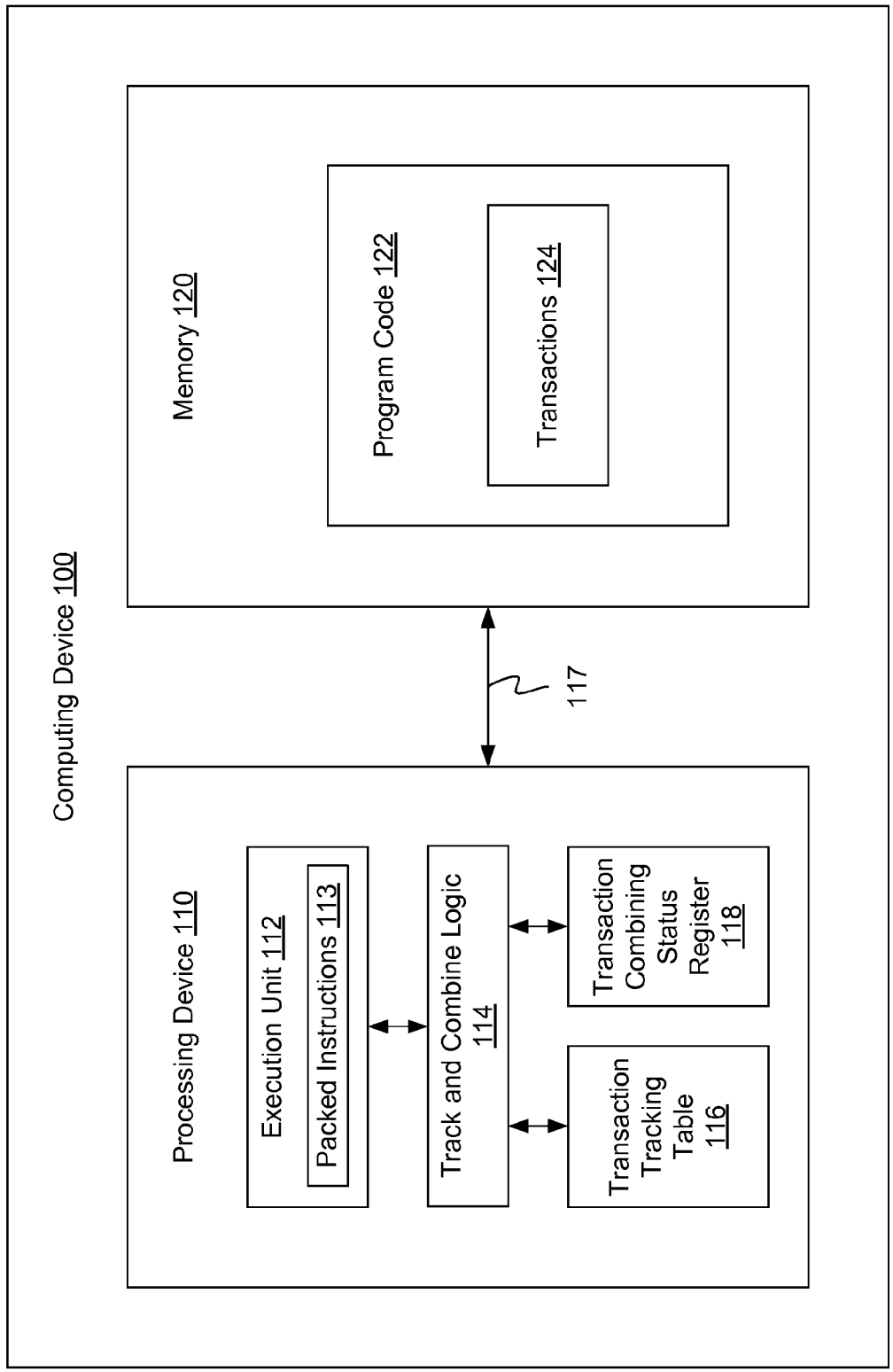
FIG. 1 is a block diagram illustrating a computing device with a processing device that performs automatic transaction coarsening, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for automatic transaction coarsening. A transaction may include a section of code in a computer application program that is designed to atomically execute on a shared data store. The execution is atomic if it appears to the rest of the system to occur instantaneously. Thus, atomicity is a guarantee of isolation from concurrently executing threads or processes. In general, atomic operations or instructions may have a succeed-or-fail definition, such that they either successfully change the state of the system (e.g., writing to a location in memory), or have no apparent effect. In one embodiment, a transaction is defined in the code using a transaction begin instruction (i.e., an xbegin instruction) and a transaction end instruction (i.e., an xend instruction). Between the transaction begin instruction and the transaction end instruction may be one or more operation instructions that perform the actual operation of the section of code defined as the transaction.

The atomic execution of instructions using transactions is not without overhead. For each transaction begin instruction, the system creates a checkpoint to save state information to allow for rollback in the event that the transaction fails, encounters an error or is otherwise aborted. For each transaction end instruction, the system determines whether the operations in the transactions were successful and whether to expose memory locations that were modified by the transaction to other components of the system. In one embodiment, in order to minimize this overhead, track and combine logic within a processing device may combine multiple transactions into a single transaction to be executed on the processing device. The single transaction may include a single transaction begin instruction and a single transaction end instruction. The single transaction begin instruction may be the transaction begin instruction of the first transaction and the single transaction end instruction may be the transaction end instruction of the last transaction. The track and combine logic may ignore all other intermediate transaction begin and transaction end instructions during execution of the single combined transaction.

In one embodiment, the track and combine logic may monitor an execution of a plurality of transactions on a processing device over time. During the monitoring the track and combine logic may track a number of occurrences of each transaction and track a number of aborts in the execution of each of the plurality of transactions. An abort may occur when an operation instruction in the transaction fails to execute successfully, then the transaction conflicts with another thread or process in the system (e.g., by attempting to write to a memory location read by another read or attempting to read a memory location written by the other thread), if a write buffer reaches capacity before the transaction completes, if the transaction attempts an I/O operation, or for some other reason. Based on the tracking, the track and combine logic may identify a subset of transactions to combine into a single combined transaction for execution on the processing device. In one embodiment, the track and combine logic identifies a transaction as a suitable candidate for combination when the number of occurrences of each transaction is greater than a first threshold and when the ratio of the number of aborts to the number of occurrences of a transaction is less than a second threshold. The track and combine logic then combines the subset of transactions into the single combined transaction.

As more transactions are combined together, the chances of a transaction aborting (e.g., due to a conflict with another thread) also increase. Thus, there can be an optimal number of transactions to combine that maximizes the number of combined transactions (to reduce overhead associated with the transaction begin instructions and the transaction end instructions) and minimizes the likelihood of a conflict with an operation instruction not in the subset of transactions. This optimal number can vary by application, by input or even across different parts of an input set. Thus, the track and combine logic can automate the combining of transactions to reduce overhead and improve operating efficiency of the processing device.

FIG. 1 is a block diagram illustrating a computing device with a processing device that performs automatic transaction coarsening, according to an embodiment. In one embodiment, the computing device 100 includes processing device 110 and memory 120. Computing device 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for process data, such as in the embodiments described herein. Processing device 110 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, computing device 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In this illustrated embodiment, processing device 110 includes one or more execution units 111 to implement an algorithm that is to perform at least one instruction. One embodiment may be described in the context of a single processor desktop or server system, but alternative embodiments may be included in a multiprocessor system. The processing device 110 may be coupled to a processor bus 117 that transmits data signals between the processing device 110 and other components in the device 100, such as memory 120.

Execution unit 111, including logic to perform integer and floating point operations, also resides in the processing device 110. The processing device 110, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 110. For one embodiment, execution unit 111 includes logic to handle a packed instruction set 113. By including the packed instruction set 113 in the instruction set of a general-purpose processing device 110, along with associated circuitry to execute the instructions, the operations used by many multimedia applications may be performed using packed data in a general-purpose processing device 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

In one embodiment, processing device 110 includes track and combine logic 114, transaction tracking table 116 and transaction combining status register 118. In one embodiment, track and combine logic 114 enters a tracking mode and monitors an execution of a plurality of transactions 124 by execution unit 112 of processing device 110 over time. During the monitoring, track and combine logic 114 may track a number of occurrences of each transaction and track a number of aborts in the execution of each transaction. In one embodiment, track and combine logic 114 may store this tracking data in transaction tracking table 116. In other embodiments, track and combine logic 114 may store the tracking data in some other location, such as for example, in memory 120. Based on the tracking, track and combine logic 114 may identify a subset of the of transactions to combine into a single combined transaction for execution by processing device 110. In one embodiment, track and combine logic 114 identifies a transaction as a suitable candidate for combination when the number of occurrences of each transaction is greater than a first threshold and when the ratio of the number of aborts to the number of occurrences of a transaction is less than a second threshold. Track and combine logic 114 may enter a combination mode where multiple sequential transactions are combined into a single combined transaction. In one embodiment, transaction combining status register 118 maintains current status information for track and combine logic 114 (e.g., tracking mode, combination mode, etc.) and other information. Additional details of track and combine logic 114, transaction tracking table 116 and transaction combining status register are provided below with respect to FIGS. 2-6.

Memory 120 may include a main memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, memory 120 may include some other type of storage device for storing information in a form (e.g., software, processing application) readable by a machine (e.g., a computer). The storage device may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

In one embodiment, memory 120 includes program code 122. Program code 122 may include a series of instructions corresponding to an operating system, an application, or some other computer application program. In one embodiment, program code 122 includes one or more transactions 124. Transactions 124 are sections of code in program code 122 that are designed to atomically execute on a shared data store. In general, atomic operations or instructions may have a succeed-or-fail definition, such that they either successfully change the state of the system (e.g., writing to a location in memory), or have no apparent effect. In one embodiment, transactions 124 are defined in program code 122 using a transaction begin instruction (i.e., an xbegin instruction) and a transaction end instruction (i.e., an xend instruction). Between the transaction begin instruction and the transaction end instruction may be one or more operation instructions that perform the actual operation of the section of code defined as the transaction 124.

Figure 2:
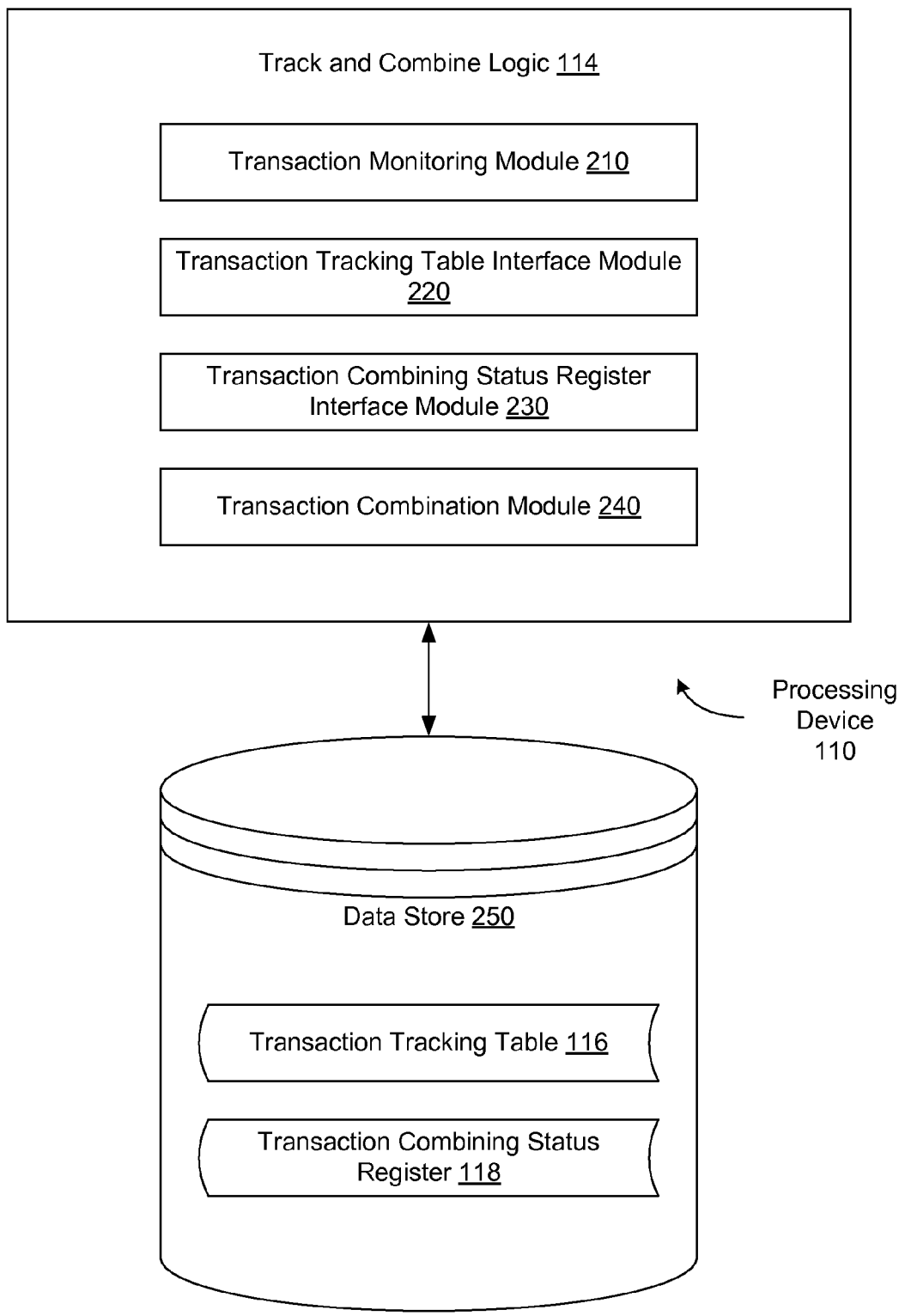
FIG. 2 is a block diagram illustrating track and combine logic in a processing device, according to an embodiment.

FIG. 2 is a block diagram illustrating track and combine logic in a processing device, according to an embodiment. In one embodiment, track and combine logic 114 includes transaction monitoring module 210, transaction combining status register interface module 230 and transaction combination module 240. This arrangement of modules and components may be a logical separation, and in other embodiments, these modules or other components can be combined together or separated in further components, according to a particular embodiment. In one embodiment, data store 250 is connected to track and combine logic 114 and transaction tracking table 116 and transaction combining status register 118. In one embodiment, processing device 110 may include both track and combine logic 114 and data store 250. In another embodiment, data store 250 may be external to processing device 110 and may be connected to track and combine logic 114 over a network or other connection. In other embodiments, processing device 110 may include different and/or additional components which are not shown to simplify the description. Data store 250 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, transaction monitoring module 210 monitors an execution of a plurality of transactions 124 by execution unit 112 of processing device 110 over time. During the monitoring, transaction monitoring module 210 may track a number of occurrences of each transaction and track a number of aborts in the execution of each transaction. In one embodiment, transaction monitoring module 210 may pass this tracking data to transaction tracking table interface module 220. Transaction tracking table interface module may store this tracking data in a corresponding entry in transaction tracking table 116. In other embodiments, transaction tracking table interface module 220 may store the tracking data in some other location, such as for example, in memory 120.

Based on the tracking, transaction combination module 240 may identify a subset of the of transactions to combine into a single combined transaction for execution by processing device 110. In one embodiment, transaction combination module 240 compares the number of occurrences of each transaction, which may be read from transaction tracking table 116, to a first threshold. The first threshold defines how many times a given transaction should be seen by track and combine logic 114 before the transaction is considered for combination into a single combined transaction. In one embodiment, the first threshold may be defined by a programmer, system administrator, user, or other individual. For example, the first threshold may be two occurrences, three, occurrences, five occurrences, ten occurrences, or some other number of occurrences. In one embodiment, the value of the first threshold may be application specific or transaction specific, such that different thresholds are defined for different situations.

In one embodiment, transaction combination module 240 also compares the ratio of the number of aborts to the number of occurrences of a transaction, which may be determined from transaction tracking table 116, to a second threshold. The second threshold defines how often a transaction should successfully complete execution (i.e., without aborting) before the transaction is considered for combination into a single combined transaction. In one embodiment, the second threshold may be defined by a programmer, system administrator, user, or other individual. For example, the second threshold may be one percent, five percent, ten percent or some other ratio. In one embodiment, the value of the second threshold may be application specific or transaction specific, such that different thresholds are defined for different situations.

Transaction combination module 240 may identify a transaction as a suitable candidate for combination when the number of occurrences of each transaction is greater than the first threshold and when the ratio of the number of aborts to the number of occurrences of a transaction is less than the second threshold. If both thresholds are met, transaction combination module 240 may notify transaction combining status register interface module 230. Transaction combining status register interface module 230 may load a value indicating a combination mode into transaction combining status register 118. In the combining mode, transaction combination module 240 may combine multiple sequential transactions into a single combined transaction. The single combined transaction may include a single transaction begin instruction and a single transaction end instruction. The single transaction begin instruction may be the transaction begin instruction of the first transaction and the single transaction end instruction may be the transaction end instruction of the last transaction. In order to form the single combined transaction instruction, transaction combination module 240 may instruct the execution unit 112 to ignore all other intermediate transaction begin and transaction end instructions during execution of the single combined transaction. The execution unit may skip these intermediate transaction begin and transaction end instructions, thereby avoiding the overhead operations associated therewith, and sequentially execute the operation instructions associated with each of the transactions begin combined. Additional details of track and combine logic 114 are described below.

FIG. 3A is a diagram illustrating a transaction tracking table, according to an embodiment. In one embodiment, transaction tracking table 116 is representative of transaction tracking table 116 shown in FIGS. 1 and 2. In one embodiment, transaction tracking table 116 can be used to store tracking data captured by transaction monitoring module 210 during the monitoring of execution of transactions by processing device 110. In one embodiment, transaction tracking table 116 includes a number of horizontal rows, each corresponding to a different entry. Each entry in transaction tracking table 116 may be associated with a different transaction. The vertical columns in transaction tracking table 116 may each correspond to a different piece of tracking data associated with the transactions. In other embodiments, tracking table 116 may be arranged in some other fashion. In other embodiments, tracking table 116 may be some other form of data structure.

In one embodiment, each entry in transaction tracking table 116 is identified by the transaction begin instruction (i.e., xbegin instruction). Each unique transaction begin instruction may be found at a different address in memory 120. This memory address (more generically, a program counter) may be referred to as an instruction pointer (IP). In one embodiment, the value of the IP is stored in the first column labeled "xbegin IP." When transaction monitoring module 210 encounters a transaction begin instruction during execution of program code 122, transaction tracking table interface module 220 may check transaction tracking table 116 to see if an entry matching the IP of the transaction begin instruction is found. If no matching entry is found, transaction tracking table interface module 220 may create a new entry corresponding to the transaction and store the IP in the "xbegin IP" field.

If an entry already exists in transaction tracking table 116 corresponding to the transaction, transaction tracking table interface module 220 may increment a counter field labeled "number of xbegins." The "number of xbegins" field may be a running counter of the number of times each transaction begin instruction is encountered. As described above, transaction combination module 240 may compare this value to the first threshold when making a determination of whether a given transaction is a suitable candidate for combination into a single combined transaction.

As execution of the program code 122 on processing device 110 continues, transaction monitoring module 210 may encounter a transaction end instruction associated with the previously encountered transaction begin instruction. In one embodiment, transaction tracking table interface module 220 stores the IP of the transaction begin instruction in a field labeled "xend IP" of the entry associated with the transaction. If transaction monitoring module 210 does not encounter a transaction end instruction, or the transaction otherwise aborts before successful completion, transaction tracking table interface module 220 may increment a counter field labeled "number of aborts." The "number of aborts" field may be a running counter of the number of times each transaction aborts prior to successful completion. As described above, transaction combination module 240 may use this value to compute the ratio of aborts to occurrences of a transaction and compare this ratio to the second threshold when making a determination of whether a given transaction is a suitable candidate for combination into a single combined transaction.

Transaction tracking table 116 may further include a column of fields labeled "Status." The "Status" field may store an indication of a current status of the corresponding transaction. Examples of the status may include whether the transaction is still in training (e.g., when the number of occurrences of the transaction begin instruction has not yet reach the first threshold), whether the transaction is a suitable candidate for combination (e.g., when the ratio of aborts to occurrences is below the second threshold), whether the transaction is not a suitable candidate for combination (e.g., when the ratio of aborts to occurrences is above the second threshold), or some other status. The value in the "Status" field may be initialized to a training mode and may be later written by transaction combination module 240 based on the results of the comparisons described above.

In one embodiment, transaction tracking table 116 may additionally include a field labeled "number of iterations." The "number of iterations" field may indicate the number of transactions that should be combined into a single combined transaction. This value may be a predetermined number set by the programmer or may be dynamically determined based on previous executions of program code 122. In one embodiment, transaction tracking table 116 may additionally include a field labeled "size of transaction." The "size of transaction" field may indicate the number of instructions or operations in the transaction. In another embodiment, the "size of transaction" field may indicate the amount of time (e.g., clock cycles) that the computing device took to execute the most recent instance of the transaction. Transaction combination module 240 may in part determine the value of the "number of iterations" field from the value of the "size of transaction" field. For example, the value of "number of iterations" could be set (e.g., according to an algorithm) at a higher value for a "smaller" transaction (based on the value in the "size of transaction" field and at a lower value for a "larger" transaction." In another embodiment, the value of the "number of iterations" field may be based on a fraction of aborts (e.g., the number of aborts out of the number of occurrences of the transaction), where the value goes up as the fraction of aborts goes down. When combining transactions (i.e., ignoring intermediate transaction begin and transaction end instructions), transaction combination module 240 may read the value in the "number of iterations" field for the associated transaction to determine how may transactions to combine.

FIG. 3B is a diagram illustrating a transaction combining status register, according to an embodiment. In one embodiment, transaction combining status register 118 is representative of transaction combining status register 118 shown in FIGS. 1 and 2. In one embodiment, transaction combining status register 118 can be used to store status information for the current operation of track and combine logic 114. In one embodiment, the vertical columns in transaction combining status register 118 may each correspond to a different piece of status information associated with the current transaction. In other embodiments, transaction combining status register 118 may be arranged in some other fashion. In other embodiments, transaction combining status register 118 may be some other form of data structure.

In one embodiment, transaction combining status register 118 includes a "Transaction Status" field. The "Transaction Status" field can store a value representing the current status of track and combine logic 114. For example, the value in the "Transaction Status" field can indicate that the system is in a training mode, a combining mode, a standard execution mode or some other mode of operation. Transaction combining status register 118 further includes a "Last xbegin IP" field. The "Last xbegin IP field" can store a value representing the IP of the transaction begin instruction of the most recently executed transaction. If a transaction is currently executing, the value can be that associated with the currently executing transaction. If a transaction is not currently executing, the value can be that associated with the last previously executed transaction. In one embodiment, transaction combining status register interface module 230 can read the value from transaction tracking table 116 and write the value to the "Last xbegin IP" field in transaction combining status register 118.

In one embodiment, transaction combining status register 118 further includes a "Expected xend IP" field. The "Expected xend IP" field can store a value representing the IP of the transaction end instruction of the currently executing or most recently executed transaction. In one embodiment, the value in the "Expected xend IP field" may be the value corresponding to the value in the "Last xbegin IP" field, which may be read from transaction tracking table 116. In one embodiment, transaction combining status register interface module 230 can read the "xend IP" value from transaction tracking table 116 and write the value to the "Expected xend IP" field in transaction combining status register 118.

Transaction combining status register 118 can further include a "number of transactions to combine field." In one embodiment, the "number of transactions to combine" field contains a counter that transaction combination module 240 can use to determine how many additional transactions to combine. The counter may be initialized to zero and count up to the value read from the "number of iterations" field in transaction tracking table 116 for the associated transaction. Alternatively, the counter may be initialized to the value read from the "number of iterations" field in transaction tracking table 116 for the associated transaction and count down to zero.

Figure 4:
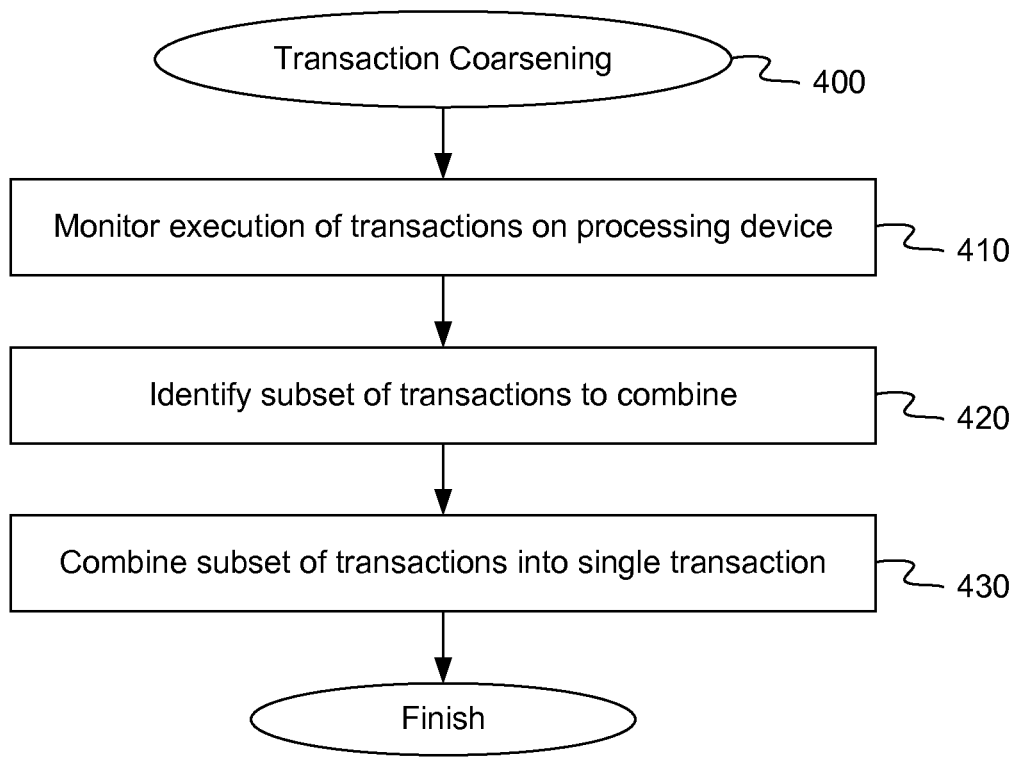
FIG. 4 is a flow diagram illustrating a method for automatic transaction coarsening, according to an embodiment.

FIG. 4 is a flow diagram illustrating a method for automatic transaction coarsening, according to an embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. The processing logic may automatically coarsen (i.e., combine) multiple transactions into a single combined transaction. In one embodiment, the method 400 is performed by track and combine logic 114, as shown in FIGS. 1 and 2.

Referring to FIG. 4, at block 410, method 400 monitors the execution of transactions on processing device 110. In one embodiment, transaction monitoring module 210 monitors an execution of a plurality of transactions 124 by execution unit 112 of processing device 110 over time. During the monitoring, transaction monitoring module 210 may track a number of occurrences of each transaction and track a number of aborts in the execution of each transaction. In one embodiment, transaction monitoring module 210 may pass this tracking data to transaction tracking table interface module 220. Transaction tracking table interface module may store this tracking data in a corresponding entry in transaction tracking table 116.

Based on the tracking, at block 420, method 400 identifies a subset of the transactions to combine into a single combined transaction for execution by processing device 110. In one embodiment, transaction combination module 240 compares the number of occurrences of each transaction, which may be read from transaction tracking table 116, to a first threshold. In one embodiment, transaction combination module 240 also compares the ratio of the number of aborts to the number of occurrences of a transaction, which may be determined from transaction tracking table 116, to a second threshold. Transaction combination module 240 may identify a transaction as a suitable candidate for combination when the number of occurrences of each transaction is greater than the first threshold and when the ratio of the number of aborts to the number of occurrences of a transaction is less than the second threshold.

At block 430, method 400 combines the identified subset of transactions into a single combined transaction. In one embodiment, transaction combination module 240 may combine multiple sequential transactions into a single combined transaction. The single combined transaction may include a single transaction begin instruction and a single transaction end instruction. The single transaction begin instruction may be the transaction begin instruction of the first transaction and the single transaction end instruction may be the transaction end instruction of the last transaction. In order to form the single combined transaction instruction, transaction combination module 240 may instruct the execution unit 112 to ignore all other intermediate transaction begin and transaction end instructions during execution of the single combined transaction. The execution unit may skip these intermediate transaction begin and transaction end instructions, thereby avoiding the overhead operations associated therewith, and sequentially execute the operation instructions associated with each of the transactions begin combined.

FIGS. 5A-5D are flow diagrams illustrating a method for automatic transaction coarsening, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may automatically coarsen (i.e., combine) multiple transactions into a single combined transaction. In one embodiment, the method 500 is performed by track and combine logic 114, as shown in FIGS. 1 and 2.

Figure 5A:
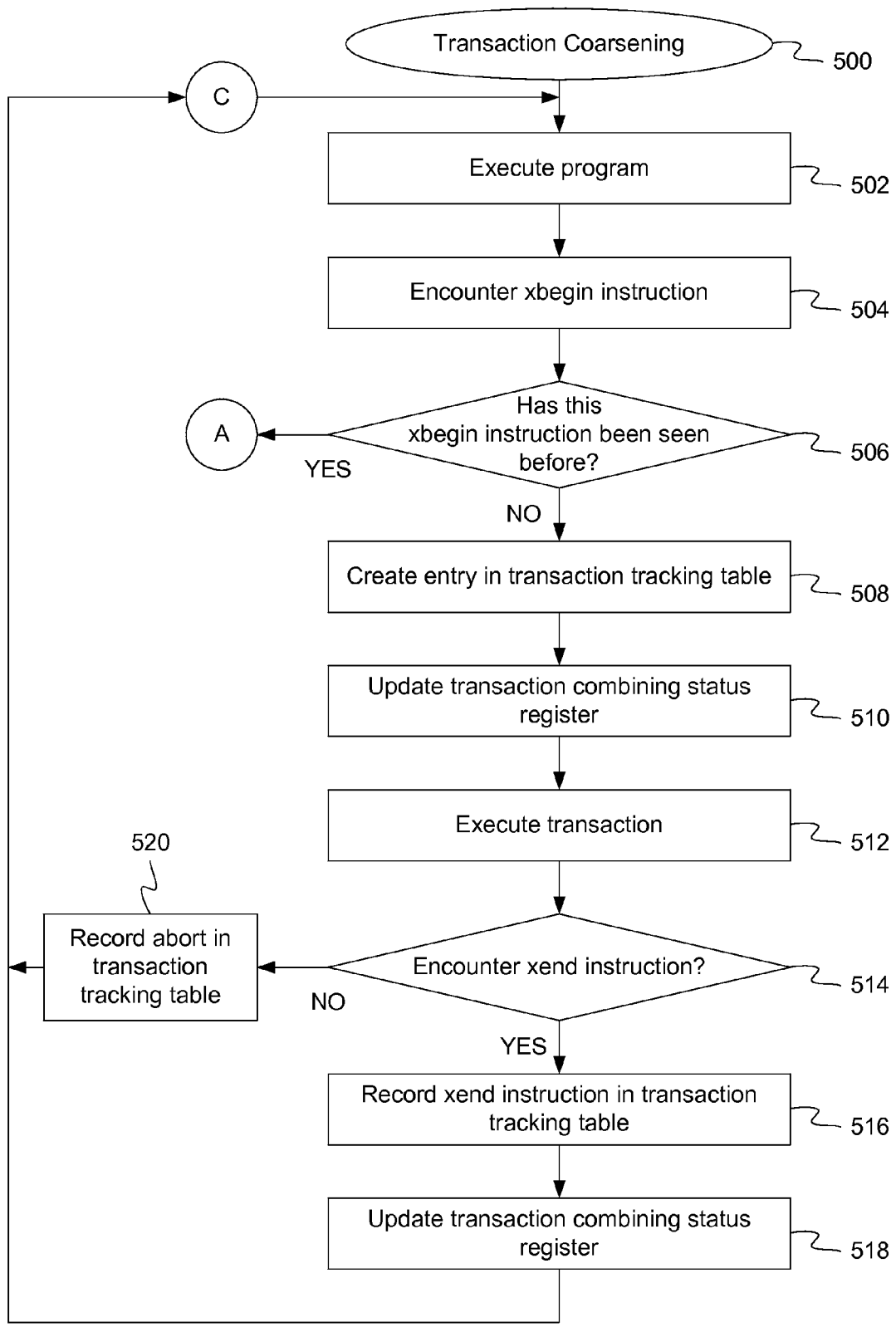
FIGS. 5A-5D are flow diagrams illustrating a method for automatic transaction coarsening, according to an embodiment.

Referring to FIG. 5A, at block 502, method 500 executes program code 122. Program code 122 may include a series of instructions corresponding to an operating system, an application, or some other computer application program. In one embodiment, program code 122 includes one or more transactions 124. Transactions 124 are sections of code in program code 122 that are designed to atomically execute on a shared data store. In general, atomic operations or instructions may have a succeed-or-fail definition, such that they either successfully change the state of the system (e.g., writing to a location in memory), or have no apparent effect. In one embodiment, transactions 124 are defined in program code 122 using a transaction begin instruction (i.e., an xbegin instruction) and a transaction end instruction (i.e., an xend instruction). Between the transaction begin instruction and the transaction end instruction may be one or more operation instructions that perform the actual operation of the section of code defined as the transaction 124.

At block 504, method 500 encounters a transaction begin instruction. In one embodiment, transaction monitoring module 210 identifies the transaction begin instruction based on a unique format or identifier of the instruction.

At block 506, method 500 determines whether this transaction begin instruction has been seen before. In one embodiment, transaction tracking table interface module 220 compares the IP of the transaction begin instruction, to a series of entries in transaction tracking table 116. Transaction tracking table interface module 220 may check transaction tracking table 116 to see if an entry matching the IP of the transaction begin instruction is found.

If at block 506, method 500 determines that the transaction begin instruction has not been seen before, at block 508, method 500 creates an entry in transaction tracking table 116. In one embodiment, transaction tracking table interface module 220 may create a new entry corresponding to the transaction and stores the IP in the "xbegin IP" field. Transaction tracking table interface module 220 may set the value in the "number of xbegins" field to one, set the value in the "number of aborts" field to zero, and set the "status field" to a value indicating "training" The "xend IP" field and the "number of iterations" field may be left blank or filled with a null or default value.

At block 510, method 500 updates transaction combining status register 118. In one embodiment, transaction combining status register interface module 230 can set the "Transaction Status" field to a value indicating "training," and the "last xbegin IP" field to the IP of the current transaction begin instruction. The "expected xend IP" field and the "number of transactions to combine" field may be left blank or filled with a null or default value.

At block 512, method 500 executes the transaction. Execution unit 112 may execute the one or more operation instructions associated with the transaction.

At block 514, method 500 determines if a transaction end instruction is encountered. In one embodiment, transaction monitoring module 210 identifies the transaction end instruction based on a unique format or identifier of the instruction.

If a transaction end instruction is encountered, at block 516, method 500 records the transaction end instruction in transaction tracking table 116. In one embodiment, transaction tracking table interface module 220 may write the IP of the transaction end instruction in the "xend IP" field of the transaction tracking table 116.

At block 518, method 500 updates transaction combining status register 118. In one embodiment, transaction combining status register interface module 230 can set the "Transaction Status" field to a value indicating "not in a transaction," leave the IP of the previous transaction begin instruction in the "last xbegin IP," and set the "expected xend IP" field to the IP of the encountered transaction end instruction.

If a transaction end instruction is not encountered, at block 520, method 500 records an abort in transaction tracking table 116. In one embodiment, transaction combining status register interface module 230 may set the "Transaction Status" field to a value indicating "not in a transaction" and provide the value in the "last xbegin IP" field to transaction tracking table interface module 220 so that transaction tracking table interface module 220 can identify the entry in transaction tracking table 116 corresponding to the transaction. Transaction tracking table interface module 220 may increment the value in the "number of aborts" field in transaction tracking table 116.

Figure 5B:
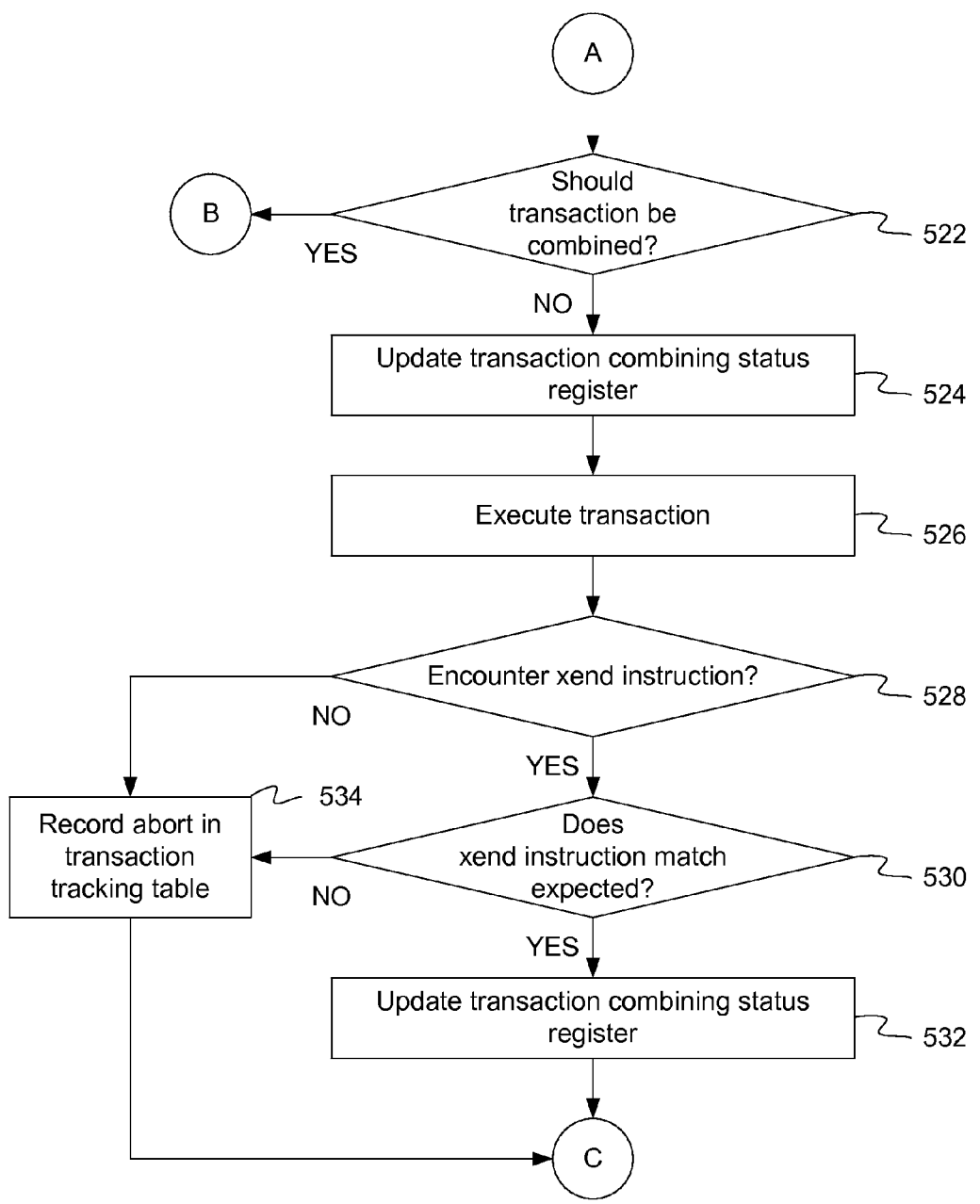

Referring to FIG. 5B, if at block 506, method 500 determines that the transaction begin instruction has been seen before, at block 522, method 500 may increment a counter field labeled "number of xbegins" and determine whether the transaction should be combined. In one embodiment, transaction combination module 240 compares the number of occurrences of the transaction begin instruction to a first threshold and compares the ratio of the number of aborts to the number of occurrences of the transaction begin instruction to a second threshold. Transaction combination module 240 may identify a transaction as a suitable candidate for combination when the number of occurrences of the transaction is greater than the first threshold and when the ratio of the number of aborts to the number of occurrences of the transaction begin instruction is less than the second threshold.

If at block 522, method 500 determines that the transaction should not be combined, at block 524, method 500 updates transaction combining status register 118. In one embodiment, transaction combining status register interface module 230 can set the "Transaction Status" field to a value indicating "training," the "last xbegin IP" field to the IP of the current transaction begin instruction, the "expected xend IP" field to the value in the "xend IP field" of transaction tracking table 116. The "number of transactions to combine" field may be left blank or filled with a null or default value.

At block 526, method 500 executes the transaction. Execution unit 112 may execute the one or more operation instructions associated with the transaction.

At block 528, method 500 determines if a transaction end instruction is encountered. In one embodiment, transaction monitoring module 210 identifies the transaction end instruction based on a unique format or identifier of the instruction.

If a transaction end instruction is encountered, at block 530, method 500 determines if the encountered transaction end instruction matches an expected transaction end instruction. In one embodiment, transaction combining status register interface module 230 can compare the encountered transaction end instruction to the value in the "expected xend IP" field of transaction combining status register 118.

If the transaction end instruction matches the expected transaction end instruction, at block 532, method 500 updates transaction combining status register 118. In one embodiment, transaction combining status register interface module 230 can set the "Transaction Status" field to a value indicating "not in a transaction."

If a transaction end instruction is not encountered or the transaction end instruction does not match the expected transaction end instruction, at block 534, method 500 records an abort in transaction tracking table 116. In one embodiment, transaction combining status register interface module 230 may set the "Transaction Status" field to a value indicating "not in a transaction" and provide the value in the "last xbegin IP" field to transaction tracking table interface module 220 so that transaction tracking table interface module 220 can identify the entry in transaction tracking table 116 corresponding to the transaction. Transaction tracking table interface module 220 may increment the value in the "number of aborts" field in transaction tracking table 116.

Figure 5C:
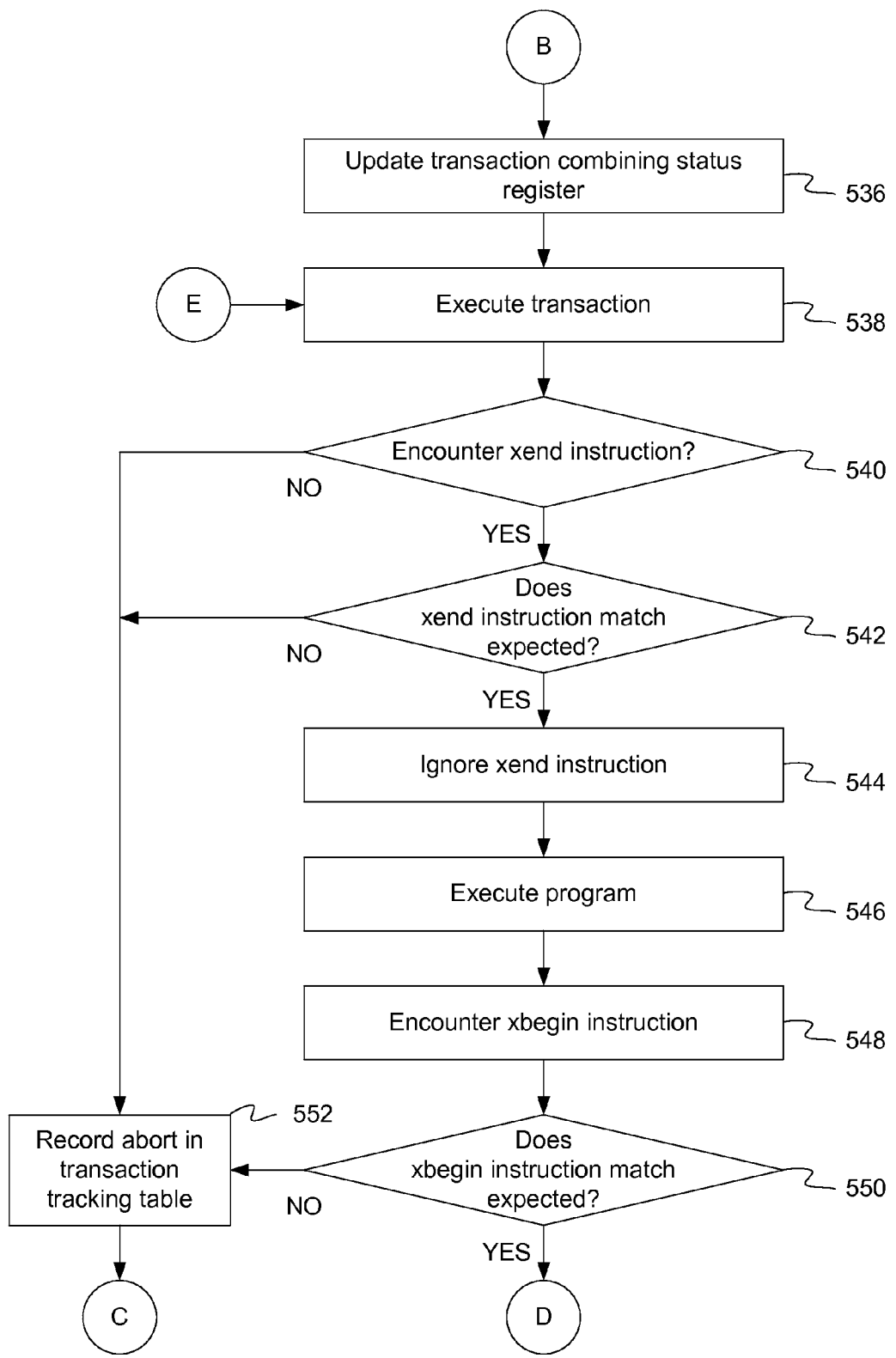

Referring to FIG. 5C, if at block 522, method 500 determines that the transaction should be combined, at block 536, method 500 updates transaction combining status register 118. In one embodiment, transaction tracking table interface module 220 can set the "Status" field in transaction tracking table 116 to a value indicating "combining" and set the "number of iterations" field to a value calculated based on the ratio of aborts to encountered transaction begin instructions. In one embodiment, transaction combining status register interface module 230 can set the "Transaction Status" field to a value indicating "combining," the "last xbegin IP" field to the IP of the current transaction begin instruction, the "expected xend IP" field to the value in the "xend IP field" of transaction tracking table 116. The "number of transactions to combine" field may set to the value from the "number of iterations" field in transaction tracking table 116 or to a different value calculated based on the ratio of aborts to encountered transaction begin instructions.

At block 538, method 500 executes the transaction. Execution unit 112 may execute the one or more operation instructions associated with the transaction.

At block 540, method 500 determines if a transaction end instruction is encountered. In one embodiment, transaction monitoring module 210 identifies the transaction end instruction based on a unique format or identifier of the instruction.

If a transaction end instruction is encountered, at block 542, method 500 determines if the encountered transaction end instruction matches an expected transaction end instruction. In one embodiment, transaction combining status register interface module 230 can compare the encountered transaction end instruction to the value in the "expected xend IP" field of transaction combining status register 118.

If the transaction end instruction matches the expected transaction end instruction, at block 544, method 500 ignores the transaction end instruction. In one embodiment, transaction combination module 240 notifies execution unit 112 not to process the transaction end instruction.

At block 546, method 500 executes the program code 122. In one embodiment, execution unit 112 continues to sequentially execute the instructions in program code 122 until another transaction is encountered.

At block 548, method 500 encounters a transaction begin instruction. In one embodiment, transaction monitoring module 210 identifies the transaction begin instruction based on a unique format or identifier of the instruction.

At block 550, method 500 determines if the encountered transaction begin instruction matches an expected transaction begin instruction. In one embodiment, transaction combining status register interface module 230 can compare the encountered transaction begin instruction to the value in the "last xbegin IP" field of transaction combining status register 118.

If a transaction end instruction is not encountered at block 540, the transaction end instruction does not match the expected transaction end instruction at block 542, or the encountered transaction begin instruction does not match the expected transaction begin instruction at block 550, at block 552, method 500 records an abort in transaction tracking table 116. In one embodiment, transaction combining status register interface module 230 may set the "Transaction Status" field to a value indicating "not in a transaction" and provide the value in the "last xbegin IP" field to transaction tracking table interface module 220 so that transaction tracking table interface module 220 can identify the entry in transaction tracking table 116 corresponding to the transaction. Transaction tracking table interface module 220 may increment the value in the "number of aborts" field in transaction tracking table 116.

Figure 5D:
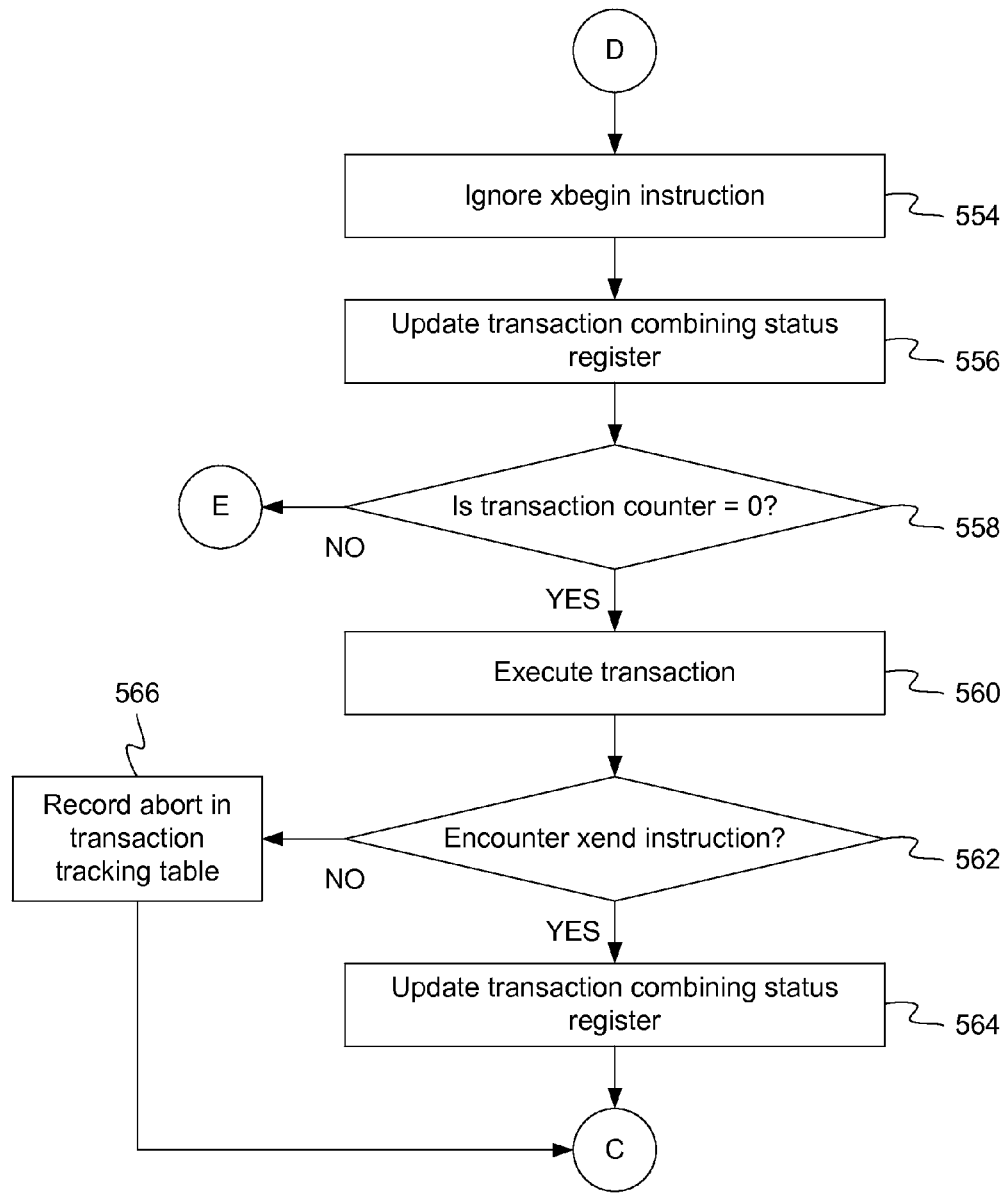

Referring to FIG. 5D, if at block 550, the encountered transaction begin instruction matches an expected transaction begin instruction, at block 554, method 500 ignores the transaction begin instruction. In one embodiment, transaction combination module 240 notifies execution unit 112 not to process the transaction end instruction.

At block 556, method 500 updates transaction combining status register 118. In one embodiment, transaction combining status register interface module 230 can set the "Transaction Status" field to a value indicating "combining," and the "last xbegin IP" field to the IP of the current transaction begin instruction. The "expected xend IP" field can be set to the corresponding value from transaction tracking table 116 and the value in the "number of transactions to combine" field may be decremented by one to reflect the combination.

At block 558, method 500 determines if the transaction counter is equal to zero. Transaction combining status register interface module 230 can read the value from the "number of transactions to combine" field in transaction combining status register 118 and compare the value to zero. If the transaction counter is not equal to zero, method 500 returns to block 538.

If the transaction counter is equal to zero, at block 560, method 500 executes the transaction. Execution unit 112 may execute the one or more operation instructions associated with the transaction.

At block 562, method 500 determines if a transaction end instruction is encountered. In one embodiment, transaction monitoring module 210 identifies the transaction end instruction based on a unique format or identifier of the instruction.

At block 564, method 500 updates transaction combining status register 118. In one embodiment, transaction combining status register interface module 230 can set the "Transaction Status" field to a value indicating "not in a transaction," leave the IP of the previous transaction begin instruction in the "last xbegin IP," and set the "expected xend IP" field to the IP of the encountered transaction end instruction.

If a transaction end instruction is not encountered, at block 566, method 500 records an abort in transaction tracking table 116. Method 500 may return to block 502 and repeat the operations at the blocks that follow.

Figure 6:
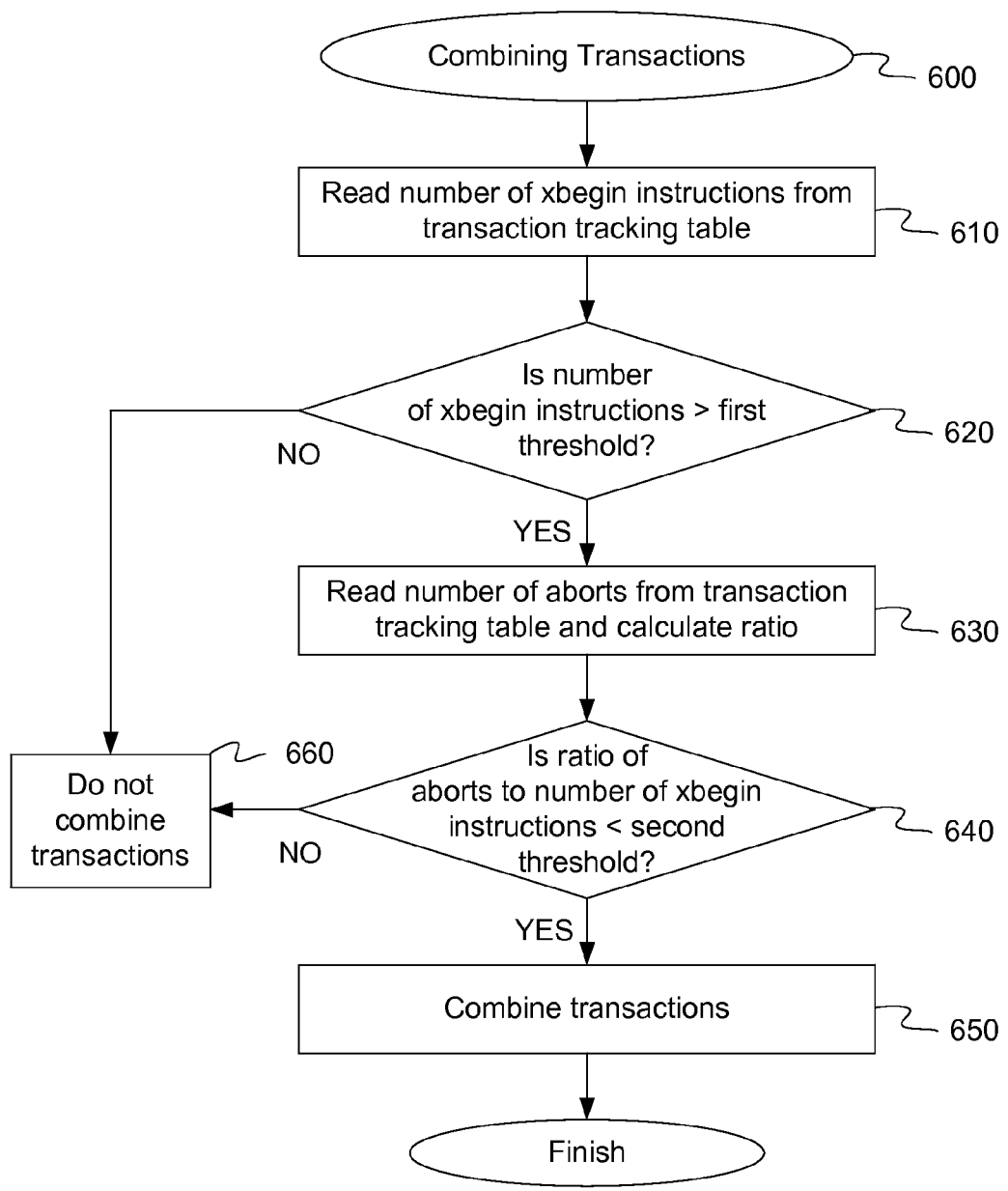
FIG. 6 is a flow diagram illustrating a method for combining transactions, according to an embodiment.

FIG. 6 is a flow diagram illustrating a method for combining transactions, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may determine whether a given transaction is a suitable candidate for being combined into a single combined transaction. In one embodiment, the method 600 is performed by track and combine logic 114, as shown in FIGS. 1 and 2.

Referring to FIG. 6, at block 610, method 600 reads a number of transaction begin instructions from transaction tracking table 116. In one embodiment, transaction combination module 240 receives an indication of an encounter transaction begin instruction from transaction monitoring module 210. Transaction combination module 240 can access transaction tracking table 116, identify the corresponding entry based on the value in the "xbegin IP" field, and determine the number of transaction begin instructions from the value in the "number of xbegins" field.

At block 620, method 600 determines if the number of transaction begin instructions is greater than a first threshold. In one embodiment, transaction combination module 240 compares the number of occurrences determined at block 610 to the first threshold. The first threshold defines how many times a given transaction should be seen by track and combine logic 114 before the transaction is considered for combination into a single combined transaction.

If at block 620, method 600 determines that the number of transaction begin instructions is greater than the first threshold, at block 630, method 600 reads a number of transaction aborts from transaction tracking table 116. In one embodiment, transaction combination module 240 can access transaction tracking table 116, identify the corresponding entry based on the value in the "xbegin IP" field, and determine the number of transaction aborts from the value in the "number of aborts" field. Transaction combination module 240 can also calculate a ratio of the number of aborts to the number of occurrences of the transaction begin instruction. This ration be expressed as a fraction, as a decimal, as a percentage, or in some other manner.

At block 640, method 600 determines whether the ratio of aborts to the number of transaction begin instructions is less than a second threshold. In one embodiment, transaction combination module 240 compares the ratio of the number of aborts to the number of occurrences of the transaction begin instruction to the second threshold. The second threshold defines how often a transaction should successfully complete execution (i.e., without aborting) before the transaction is considered for combination into a single combined transaction. In one embodiment, the value of the second threshold may be application specific or transaction specific, such that different thresholds are defined for different situations.

If at block 640, method 600 determines that the ratio of aborts to the number of transaction begin instructions is less than the second threshold, at block 650, method 600 combines the current transaction with either a previous or subsequent transaction. Transaction combining status register interface module 230 may load a value indicating a combination mode into transaction combining status register 118. In the combining mode, transaction combination module 240 may combine multiple sequential transactions into a single combined transaction. In order to form the single combined transaction instruction, transaction combination module 240 may instruct execution unit 112 to ignore all other intermediate transaction begin and transaction end instructions during execution of the single combined transaction. The execution unit may skip these intermediate transaction begin and transaction end instructions, thereby avoiding the overhead operations associated therewith, and sequentially execute the operation instructions associated with each of the transactions begin combined.

If at block 620, method 600 determines that the number of transaction begin instructions is not greater than the first threshold, or at block 640, method 600 determines that the ratio of aborts to the number of transaction begin instructions is not less than the second threshold, at block 660, method 600 does not combine the transactions. In one embodiment, transaction combination module 240 does nothing to affect the execution of the transactions. Execution unit 112 may execute the transaction begin instructions and transaction end instructions for each transaction in the normal fashion.

Figure 7:
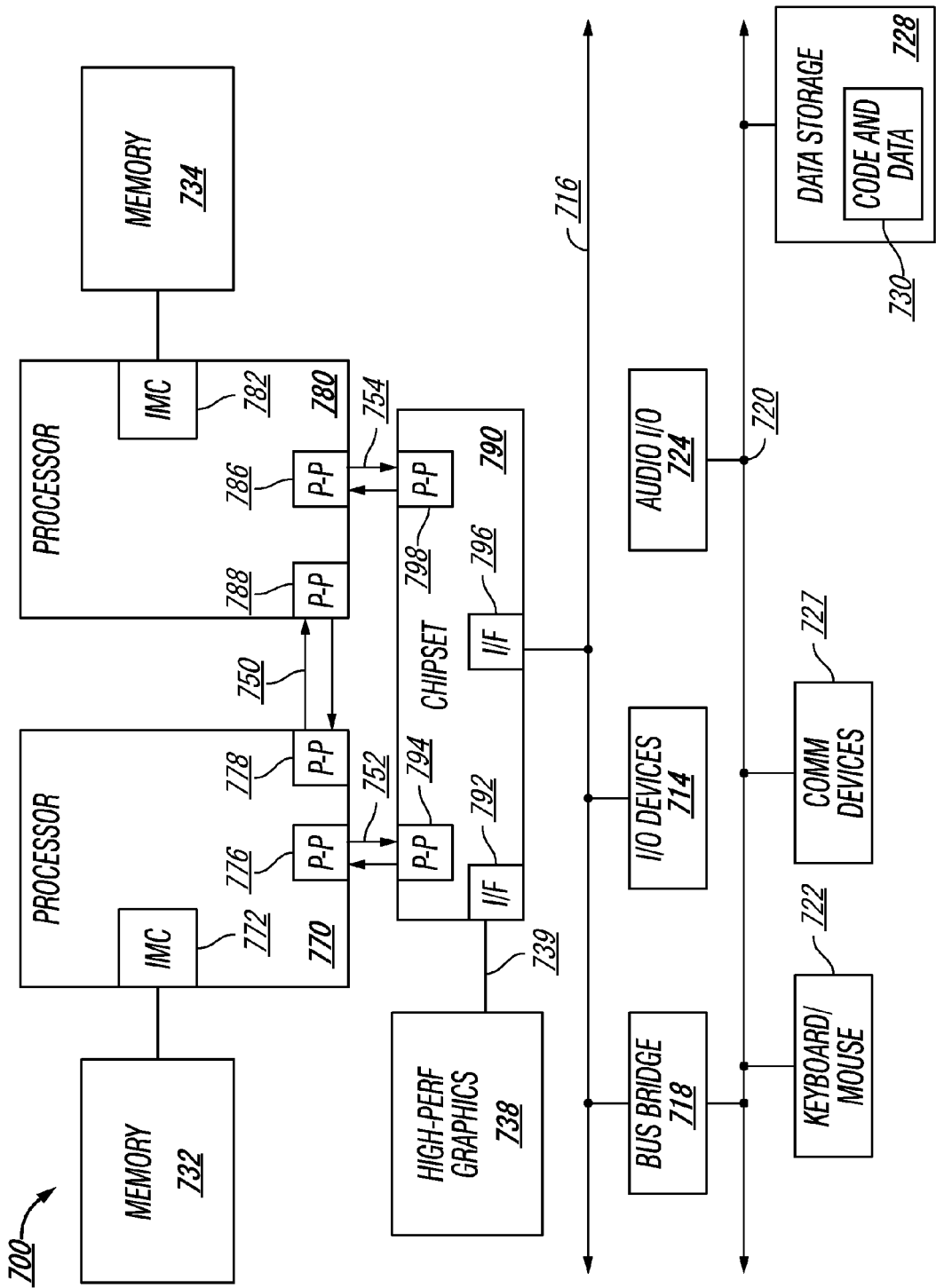
FIG. 7 is a block diagram of a computer system, according to an embodiment.

Referring now to FIG. 7, shown is a block diagram of a system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processing device 110, as shown in FIG. 1.

While shown with only two processors 770, 780, it is to be understood that the scope of the present disclosure is not so limited. In other embodiments, one or more additional processors may be present in a given processor. Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770 and 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
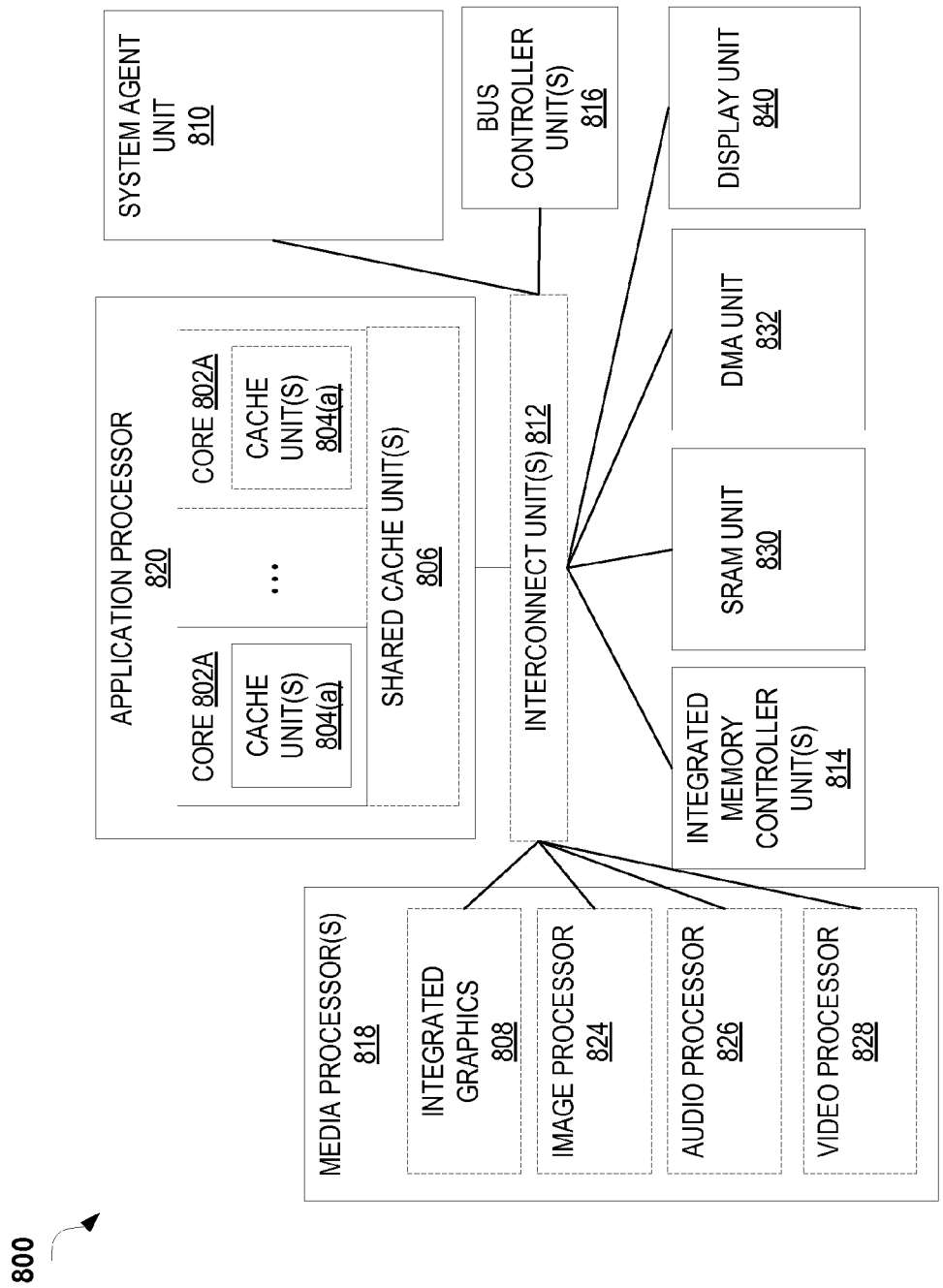
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include a microcode context and aliased parameter passing logic as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set. The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
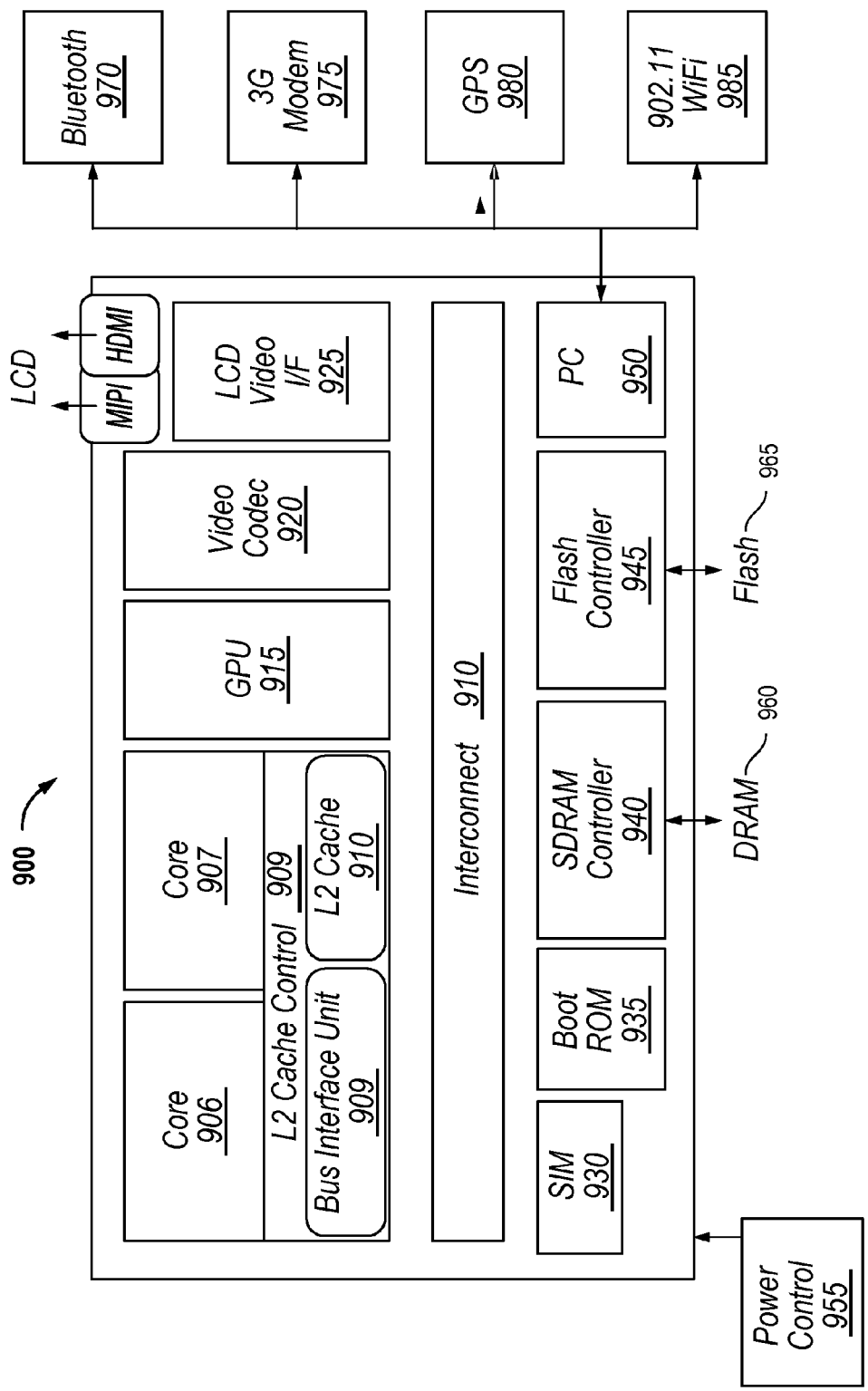
FIG. 9 is a block diagram of an embodiment of a system on-chip (SOC) design.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes two cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, a microcode context and aliased parameter passing logic may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

Figure 10:
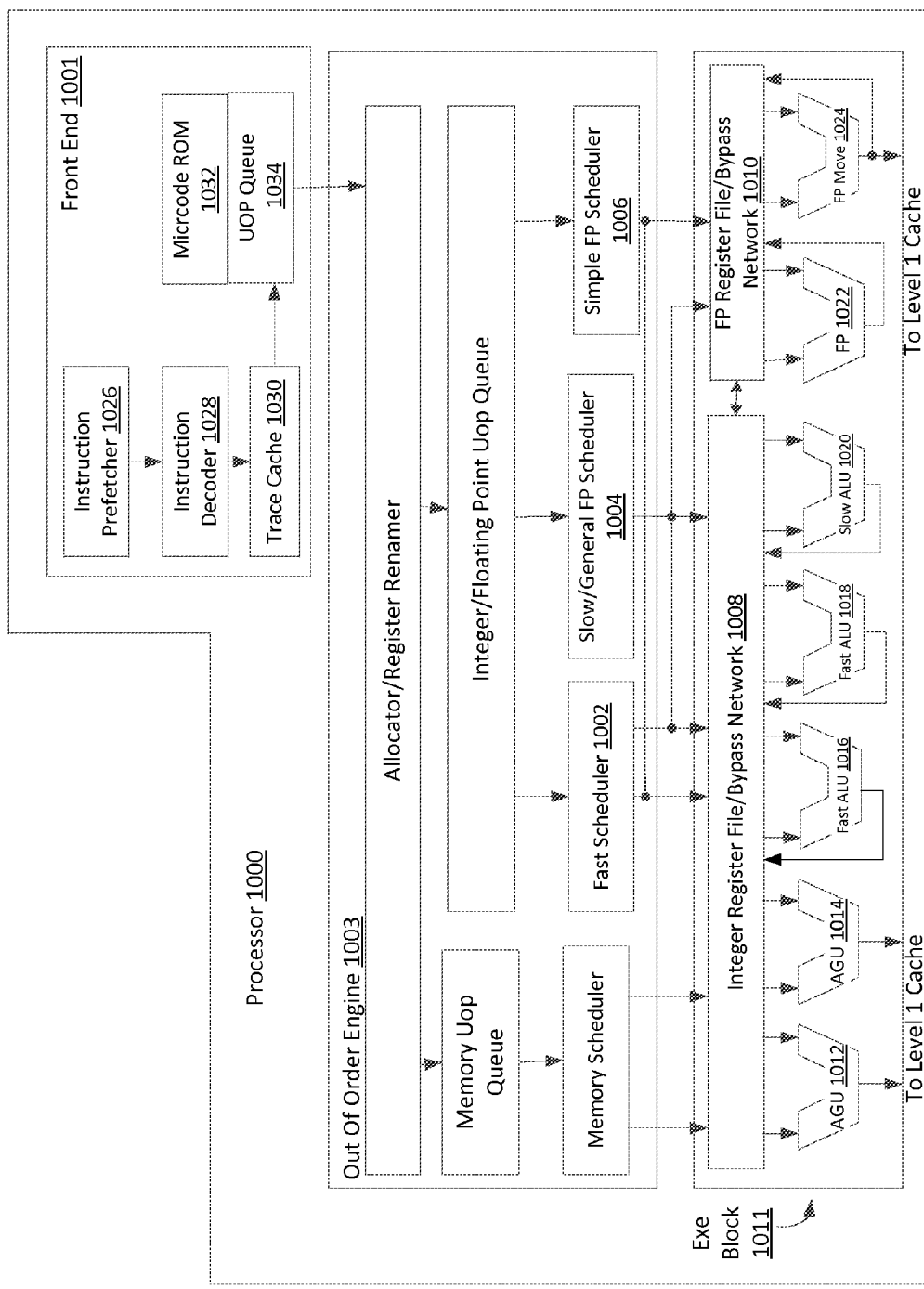
FIG. 10 illustrates a block diagram of the micro-architecture for a processor in accordance with one embodiment of the disclosure.

FIG. 10 is a block diagram of the micro-architecture for a processor 1000 that includes logic circuits to perform instructions in accordance with one embodiment. The processor 1000 may be one example of the processing device 110, described above with respect to FIG. 1. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 1001 is the part of the processor 1000 that fetches instructions to be executed and prepares them to be used later in the processor pipeline. The front end 1001 may include several units. In one embodiment, the instruction prefetcher 1026 fetches instructions from memory and feeds them to an instruction decoder 1028 which in turn decodes or interprets them. For example, in one embodiment, the decoder decodes a received instruction into one or more operations called "micro-instructions" or "micro-operations"(also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others need several micro-ops to complete the full operation. In one embodiment, if more than four micro-ops are needed to complete a instruction, the decoder 1028 accesses the microcode ROM 1032 to do the instruction. For one embodiment, an instruction can be decoded into a small number of micro ops for processing at the instruction decoder 1028. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For some embodiments, instructions involving a floating point value may be handled with the floating point hardware. In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

The following examples pertain to further embodiments.

Example 1 is a processing device comprising: 1) an instruction execution unit; and 2) track and combine logic to combine a plurality of transactions into a single combined transaction, the track and combine logic comprising a transaction monitoring module to monitor an execution of a plurality of transactions by the instruction execution unit, each of the plurality of transactions comprising a transaction begin instruction, at least one operation instruction and a transaction end instruction and a transaction combination module to identify, in view of the monitoring, a subset of the plurality of transactions to combine into a single combined transaction for execution on the processing device and to combine the identified subset of the plurality of transactions into the single combined transaction, the single combined transaction comprising a single transaction begin instruction, a plurality of operation instructions corresponding to the subset of the plurality of transactions and a single transaction end instruction.

In Example 2, the processing device of Example 1, can optionally include each of the plurality of transactions comprising a section of code in a computer application program designed to atomically execute on a shared data store.

In Example 3, the processing device of Example 1, can optionally include to monitor the execution of the plurality of transactions, the transaction monitoring module to track a number of occurrences of each of the plurality of transactions and track a number of aborts in the execution of each of the plurality of transactions.

In Example 4, the processing device of Example 3, can optionally include to identify the subset of the plurality of transactions to combine into the single combined transaction, the transaction combination module to compare the number of occurrences of each of the plurality of transactions to a first threshold and compare a ratio of the number of aborts to the number of occurrences of each of the plurality of transactions to a second threshold.

In Example 5, the processing device of Example 4, can optionally include the transaction combination module further to combine the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

In Example 6, the processing device of Example 1, can optionally include to combine the subset of the plurality of transactions into the single combined transaction, the transaction combination module to ignore each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

In Example 7, the processing device of Example 1, can optionally include the subset of the plurality of transactions comprising a number of transactions to reduce overhead associated with the transaction begin instructions and the transaction end instructions and to minimize a likelihood of a conflict with an operation instruction not in the subset of the plurality of transactions.

Example 8 is a method comprising 1) monitoring, by a processing device, an execution of a plurality of transactions on the processing device, each of the plurality of transactions comprising a transaction begin instruction, at least one operation instruction and a transaction end instruction; 2) identifying, in view of the monitoring, a subset of the plurality of transactions to combine into a single combined transaction for execution on the processing device; and 3) combining, by track and combine logic in the processing device, the identified subset of the plurality of transactions into the single combined transaction, the single combined transaction comprising a single transaction begin instruction, a plurality of operation instructions corresponding to the subset of the plurality of transactions and a single transaction end instruction.

In Example 9, the method of Example 8, can optionally include each of the plurality of transactions comprising a section of code in a computer application program designed to atomically execute on a shared data store.

In Example 10, the method of Example 8, can optionally include monitoring the execution of the plurality of transactions comprising tracking a number of occurrences of each of the plurality of transactions and tracking a number of aborts in the execution of each of the plurality of transactions.

In Example 11, the method of Example 10, can optionally include identifying the subset of the plurality of transactions to combine into the single combined transaction comprising comparing the number of occurrences of each of the plurality of transactions to a first threshold and comparing a ratio of the number of aborts to the number of occurrences of each of the plurality of transactions to a second threshold.

In Example 12, the method of Example 11, can optionally include combining the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

In Example 13, the method of Example 8, can optionally include combining the subset of the plurality of transactions into the single combined transaction comprising ignoring each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

In Example 14, the method of Example 8, can optionally include the subset of the plurality of transactions comprises a number of transactions to reduce overhead associated with the transaction begin instructions and the transaction end instructions and to minimize a likelihood of a conflict with an operation instruction not in the subset of the plurality of transactions.

Example 15 is a system comprising: 1) a memory to store program code comprising a plurality of transactions, each of the plurality of transactions comprising a transaction begin instruction, at least one operation instruction and a transaction end instruction; and 2) a processing device; communicably coupled to the memory, the processing device comprising track and combine logic to monitor an execution of the plurality of transactions on the processing device, identify, in view of the monitoring, a subset of the plurality of transactions to combine into a single combined transaction for execution on the processing device and combine the identified subset of the plurality of transactions into the single combined transaction, the single combined transaction comprising a single transaction begin instruction, a plurality of operation instructions corresponding to the subset of the plurality of transactions and a single transaction end instruction.

In Example 16, the system of Example 15, can optionally include each of the plurality of transactions comprising a section of the program code in a computer application program designed to atomically execute on a shared data store in the memory.

In Example 17, the system of Example 15, can optionally include to monitor the execution of the plurality of transactions, the track and combine logic to track a number of occurrences of each of the plurality of transactions, track a number of aborts in the execution of each of the plurality of transactions and store the number of occurrences and the number of aborts in a transaction tracking table.

In Example 18, the system of Example 17, can optionally include to identify the subset of the plurality of transactions to combine into the single combined transaction, the track and combine logic to compare the number of occurrences of each of the plurality of transactions to a first threshold and compare a ratio of the number of aborts to the number of occurrences of each of the plurality of transactions to a second threshold.

In Example 19, the system of Example 18, can optionally include the track and combine logic further to combine the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

In Example 20, the system of Example 15, can optionally include to combine the subset of the plurality of transactions into the single combined transaction, the track and combine logic to ignore each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

Example 21 is an apparatus comprising 1) means for monitoring an execution of a plurality of transactions on a processing device, each of the plurality of transactions comprising a transaction begin instruction, at least one operation instruction and a transaction end instruction; 2) means for identifying, in view of the monitoring, a subset of the plurality of transactions to combine into a single combined transaction for execution on the processing device; and 3) means for combining the identified subset of the plurality of transactions into the single combined transaction, the single combined transaction comprising a single transaction begin instruction, a plurality of operation instructions corresponding to the subset of the plurality of transactions and a single transaction end instruction.

In Example 22, the apparatus of Example 21, can optionally include each of the plurality of transactions comprising a section of code in a computer application program designed to atomically execute on a shared data store.

In Example 23, the apparatus of Example 21, can optionally include the means for monitoring the execution of the plurality of transactions comprising means for tracking a number of occurrences of each of the plurality of transactions and means for tracking a number of aborts in the execution of each of the plurality of transactions.

In Example 24, the apparatus of Example 23, can optionally include the means for identifying the subset of the plurality of transactions to combine into the single combined transaction comprising means for comparing the number of occurrences of each of the plurality of transactions to a first threshold and means for comparing a ratio of the number of aborts to the number of occurrences of each of the plurality of transactions to a second threshold.

In Example 25, the apparatus of Example 24, can optionally include means for combining the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

In Example 26, the apparatus of Example 21, can optionally include the means for combining the subset of the plurality of transactions into the single combined transaction comprising means for ignoring each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

In Example 27, the apparatus of Example 21, can optionally include the subset of the plurality of transactions comprising a number of transactions to reduce overhead associated with the transaction begin instructions and the transaction end instructions and to minimize a likelihood of a conflict with an operation instruction not in the subset of the plurality of transactions.

Example 28 is an apparatus comprising: 1) a memory; and 2) a computing system coupled to the memory, wherein the computing system is configured to perform the method of at least one of the claims 8-14.

In Example 29, the apparatus of Example 28, can optionally include the computing system comprising a processing device.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular embodiments may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing device comprising:
    an instruction execution unit; and
    a track and combine logic to combine a plurality of transactions into a single combined transaction, the track and combine logic comprising:
        a transaction monitoring module to monitor an execution of the plurality of transactions by the instruction execution unit, each of the plurality of transactions comprising a transaction begin instruction, at least one operation instruction and a transaction end instruction, wherein to monitor the execution, the transaction monitoring module to track a number of occurrences of each of the plurality of transactions and a number of aborts in the execution of each of the plurality of transactions; and
        a transaction combination module to identify, in view of the monitoring, a subset of the plurality of transactions to combine into the single combined transaction for execution on the processing device and to combine the identified subset of the plurality of transactions into the single combined transaction, the single combined transaction comprising a single transaction begin instruction, a plurality of operation instructions corresponding to the subset of the plurality of transactions and a single transaction end instruction.

2. The processing device of claim 1, wherein each of the plurality of transactions comprises a section of code in a computer application program designed to atomically execute on a shared data store.

3. The processing device of claim 1, wherein to identify the subset of the plurality of transactions to combine into the single combined transaction, the transaction combination module to:
    compare the number of occurrences of each of the plurality of transactions to a first threshold; and
    compare a ratio of the number of aborts to the number of occurrences of each of the plurality of transactions to a second threshold.

4. The processing device of claim 3, wherein the transaction combination module further to:
    combine the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

5. The processing device of claim 1, wherein to combine the subset of the plurality of transactions into the single combined transaction, the transaction combination module to ignore each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

6. The processing device of claim 1, wherein the subset of the plurality of transactions comprises a number of transactions to reduce overhead associated with the transaction begin instructions and the transaction end instructions and to minimize a likelihood of a conflict with an operation instruction not in the subset of the plurality of transactions.

7. A method comprising:
monitoring, by a processing device, an execution of a plurality of transactions on the processing device, each of the plurality of transactions comprising a transaction begin instruction, at least one operation instruction and a transaction end instruction, wherein the monitoring comprises tracking a number of occurrences of each of the plurality of transactions and a number of aborts in the execution of each of the plurality of transactions;
identifying, in view of the monitoring, a subset of the plurality of transactions to combine into a single combined transaction for execution on the processing device; and
combining, by a track and combine logic in the processing device, the identified subset of the plurality of transactions into the single combined transaction, the single combined transaction comprising a single transaction begin instruction, a plurality of operation instructions corresponding to the subset of the plurality of transactions and a single transaction end instruction.

8. The method of claim 7, wherein each of the plurality of transactions comprises a section of code in a computer application program designed to atomically execute on a shared data store.

9. The method of claim 7, wherein identifying the subset of the plurality of transactions to combine into the single combined transaction comprises:
comparing the number of occurrences of each of the plurality of transactions to a first threshold; and
comparing a ratio of the number of aborts to the number of occurrences of each of the plurality of transactions to a second threshold.

10. The method of claim 9, further comprising:
combining the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

11. The method of claim 7, wherein combining the subset of the plurality of transactions into the single combined transaction comprises ignoring each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

12. The method of claim 7, wherein the subset of the plurality of transactions comprises a number of transactions to reduce overhead associated with the transaction begin instructions and the transaction end instructions and to minimize a likelihood of a conflict with an operation instruction not in the subset of the plurality of transactions.

13. A system comprising:
a memory to store program code comprising a plurality of transactions, each of the plurality of transactions comprising a transaction begin instruction, at least one operation instruction and a transaction end instruction; and
a processing device; communicably coupled to the memory, the processing device comprising a track and combine logic to:
monitor an execution of the plurality of transactions on the processing device, wherein to monitor the execution, the track and combine logic is further to track a number of occurrences of each of the plurality of transactions and a number of aborts in the execution of each of the plurality of transactions;
identify, in view of the monitoring, a subset of the plurality of transactions to combine into a single combined transaction for execution on the processing device; and
combine the identified subset of the plurality of transactions into the single combined transaction, the single combined transaction comprising a single transaction begin instruction, a plurality of operation instructions corresponding to the subset of the plurality of transactions and a single transaction end instruction.

14. The system of claim 13, wherein each of the plurality of transactions comprises a section of the program code in a computer application program designed to atomically execute on a shared data store in the memory.

15. The system of claim 13, wherein to monitor the execution of the plurality of transactions, the track and combine logic to:
store the number of occurrences and the number of aborts in a transaction tracking table.

16. The system of claim 15, wherein to identify the subset of the plurality of transactions to combine into the single combined transaction, the track and combine logic to:
compare the number of occurrences of each of the plurality of transactions to a first threshold; and
compare a ratio of the number of aborts to the number of occurrences of each of the plurality of transactions to a second threshold.

17. The system of claim 16, wherein the track and combine logic further to:
combine the subset of the plurality of transactions into the single combined transaction when the number of occurrences of each of the plurality of transactions is greater than the first threshold and when the ratio of the number of aborts to the number of occurrences of each of the plurality of transactions is less than the second threshold.

18. The system of claim 13, wherein to combine the subset of the plurality of transactions into the single combined transaction, the track and combine logic to ignore each transaction begin instruction and transaction end instruction of the subset of the plurality of transactions except for the single transaction begin instruction and the single transaction end instruction, wherein the single transaction begin instruction comprises the transaction begin instruction of the first transaction in the subset and the single transaction end instruction comprises the transaction end instruction of the last transaction in the subset.

* * * * *